(12) United States Patent
Yokoyama (10) Patent No.: US 12,235,567 B2
(45) Date of Patent: Feb. 25, 2025

(54) IMAGING LENS UNIT (71) Applicant: TOKYO VISIONARY OPTICS CO., LTD., Tokyo (JP)

(72) Inventor: Takeshi Yokoyama, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 18 days.

(21) Appl. No.: 17/371,748

(22) Filed: Jul. 9, 2021

(65) Prior Publication Data

US 2022/0179289 A1 Jun. 9, 2022

(30) Foreign Application Priority Data

Jul. 9, 2020 (JP) ................. 2020-118126

(51) Int. Cl.
 *G03B 17/12* (2021.01)
 *G02B 1/04* (2006.01)
 *G02B 13/00* (2006.01)

(52) U.S. Cl.
 CPC ............ *G03B 17/12* (2013.01); *G02B 1/04* (2013.01); *G02B 13/0045* (2013.01)

(58) Field of Classification Search
 CPC ..................................................... G02B 1/04
 See application file for complete search history.

(56) References Cited

U.S. PATENT DOCUMENTS

2007/0242370 A1* 10/2007 Fukuta ................ G02B 9/34
  359/773
2018/0335607 A1   11/2018 Lin et al.
2018/0348479 A1* 12/2018 Kasama ................ G02B 9/60

FOREIGN PATENT DOCUMENTS

| JP | 2007286153 A | 11/2007 |
| JP | 2009098614 A | 5/2009 |
| JP | 2009210865 A | 9/2009 |
| JP | 2010054866 A | 3/2010 |
| JP | 2018205701 A | 12/2018 |
| JP | 2019133093 A | 8/2019 |

* cited by examiner

*Primary Examiner* — Noam Reisner
(74) *Attorney, Agent, or Firm* — Maine Cernota & Curran (57) ABSTRACT

Provided is an imaging lens unit that is able to suppress a reduction in optical performance even if plastic lenses absorb water. The imaging lens unit includes a lens barrel formed of a resin material and first to seventh plastic lenses housed in the lens barrel. Among the first to seventh plastic lenses, at least two adjacent plastic lenses have different water absorption rates and have conical fitting slopes that are centered on an optical axis, are formed outside optical effective portions of the adjacent plastic lenses, and are fittable to each other. The fitting slope of a high-water-absorption plastic lens that has a high water absorption rate is formed outside the fitting slope of a low-water-absorption plastic lens that has a low water absorption rate.

2 Claims, 4 Drawing Sheets

IMAGING LENS UNIT

TECHNICAL FIELD

The present invention relates to an imaging lens unit that forms a subject image on a solid image sensor, such as a CCD sensor or CMOS sensor.

BACKGROUND ART

Imaging lens units having a camera function are mounted on portable information devices such as smartphones, household appliances, automobiles, and the like. An imaging lens unit is a unit for forming a subject image on a solid image sensor, such as a CCD sensor or CMOS sensor, and has multiple lenses in a lens barrel. The optical performance of an imaging lens unit depends on the optical properties of each lens, as well as the degree of matching of the optical axes of the lenses housed in the lens barrel, the degree of the tilt, the degree of deviation of the surface distance from the design value, and the like.

Among methods for adjusting the optical axis between the lenses, the tilt, and the lens surface distance is a method of forming a fitting structure on the end portion of each lens and making these adjustments by fitting the lenses to each other using the fitting structures. For example, an imaging lens unit described in U.S. Unexamined Patent Application Publication No. 2018/335607 has such fitting structures. In this imaging lens unit, a fitting slope centered on an optical axis and a flat portion connected to the fitting slope are formed on the end portion of each lens. To assemble the imaging lens unit, first, the fitting slope of a first lens and the fitting slope of a second lens are fitted to each other, and the flat portion of the first lens and the flat portion of the second lens are contacted with each other. Also, the fitting slope of the second lens and the fitting slope of a third lens are fitted to each other, and the flat portion of the second lens and the flat portion of the third lens are contacted with each other. By fitting the fitting slopes to each other, the optical axes of the lenses are adjusted. By contacting the flat portions with each other, the tilt and the lens surface distance are adjusted. The imaging lens unit of U.S. Unexamined Patent Application Publication No. 2018/335607 allows for adjusting the position and posture of the lenses in the lens barrel with high accuracy.

See U.S. Unexamined Patent Application Publication No. 2018/335607.

SUMMARY OF INVENTION

Plastic lenses have often been used in recent years for the purpose of reducing the weight and cost of imaging lens units, as well as for the purpose of improving the optical performance using a non-spherical surface. A plastic lens has a water absorption rate as a value specific thereto. When plastic lenses having different water absorption rates are combined in the lens fitting structure of U.S. Unexamined Patent Application Publication No. 2018/335607, the optical performance may decrease. For example, when two plastic lenses having different water absorption rates are combined using the above fitting structures, water absorption of the lenses causes stress based on the difference between the water absorption rates inside the lenses. The stress caused inside the lenses has an influence on the lens surface distance or lens surface shape. In this case, an influence on the optical performance can be reduced by leaving the water-absorbed lenses to stand so that the lenses release the water. However, even if the water-absorbed lenses are left to stand, the optical performance of the imaging lens unit decreases if the internal stress remains or the lens surface shape or lens surface distance is changed by the internal stress.

The present invention has been made in view of this problem, and an object thereof is to provide an imaging lens unit that is able to suppress a reduction in the optical performance even if plastic lenses absorb water.

An imaging lens unit according to the present invention includes a lens barrel formed of a resin material and multiple plastic lenses housed in the lens barrel. At least two adjacent plastic lenses of the plastic lenses have different water absorption rates and have conical fitting slopes that are centered on an optical axis, are formed outside optical effective portions of the adjacent plastic lenses, and are fittable to each other. The adjacent plastic lenses include high-water-absorption and low-water-absorption plastic lenses that are plastic lenses having a high water absorption rate and a low water absorption rate, respectively, and the fitting slope of the high-water-absorption plastic lens is formed outside the fitting slope of the low-water-absorption plastic lens.

The at least two adjacent plastic lenses of the plastic lenses have the conical fitting slopes that are centered on the optical axis and are formed outside the optical effective portions thereof, that is, formed on the end portions thereof. For assembly, the fitting slopes formed on the end portions are fitted to each other. Thus, the optical axes of the lenses are matched. That is, the imaging lens unit according to the present invention has the structure in which the optical axes of the plastic lenses are matched by fitting the fitting slopes to each other. Note that it is not necessary to dispose the fitting slopes on all the plastic lenses in the lens barrel. For some plastic lenses, the optical axes thereof may be adjusted by fitting the outer circumferential surfaces of the lenses to the inner wall surface of the lens barrel.

A plastic lens having a high water absorption rate changes its volume due to water absorption to a greater degree than a plastic lens having a low water absorption rate. When plastic lenses having different water absorption rates are adjacent to each other in a conventional imaging lens unit, a change in the volume in the outward direction, that is, in a direction perpendicular to the optical axis of a plastic lens having a high water absorption rate is regulated by a fitting slope formed on a plastic lens having a low water absorption rate. This regulation causes stress based on the difference between the water absorption rates inside the lenses and thus reduces the optical performance of the imaging lens unit.

In the heat transport device according to the present invention, the fitting slope of the plastic lens having the high water absorption rate of the at least two adjacent plastic lenses is formed outside the fitting slope of the plastic lens having the low water absorption rate. Thus, even if the plastic lens having the high water absorption rate absorbs water and thus changes its volume, this plastic lens is not interfered with by the fitting slope of the plastic lens having the low water absorption rate. This results in preferable suppression of stress caused inside the lenses. In this specification, for convenience, the plastic lens having the high water absorption rate of the plastic lenses having different water absorption rates is referred to as the "high-water-absorption plastic lens, and the plastic lens having the low water absorption rate as the "low-water-absorption plastic lens."

In the imaging lens unit having the above configuration, the following condition expressions (1) and (2) are preferably satisfied:

$\beta1<0.1\%$ (1) where $\beta1$ represents the water absorption rate of the low-water-absorption plastic lens; and $\beta2>0.2\%$ (2) where $\beta2$ represents the water absorption rate of the high-water-absorption plastic lens.

The stress caused inside the plastic lenses is increased as the difference in the water absorption rate between the high-water-absorption and low-water-absorption plastic lenses is increased. When the plastic lenses satisfying the condition expressions (1) and (2) are adjacent to each other, the configuration of the imaging lens unit according to the present invention becomes particularly useful.

In the imaging lens unit having the above configuration, a water absorption rate of the lens barrel is preferably higher than water absorption rates of the plastic lenses.

When the lens barrel has a lower water absorption rate than the multiple plastic lenses and when the plastic lenses absorb water and thus expand in volume, the outer circumferential surfaces of the plastic lenses may contact the inner wall surface of the lens barrel and thus cause stress inside the lenses. By increasing the water absorption rate of the lens barrel compared to those of the plastic lenses, causing stress inside the lenses as described above is avoided.

In the imaging lens unit having the above configuration, the following condition expression (3) is preferably satisfied:

$$\beta3>0.4\% \quad (3)$$

where $\beta3$ represents the water absorption rate of the lens barrel.

In the imaging lens unit having the above configuration, a coefficient of linear expansion of the high-water-absorption plastic lens is preferably greater than a coefficient of linear expansion of the low-water-absorption plastic lens.

Expansion in volume of a plastic lens due to water absorption and the coefficient of linear expansion have a close relationship. When the coefficient of linear expansion of the high-water-absorption plastic lens is greater than the coefficient of linear expansion of the low-water-absorption plastic lens, the configuration of the imaging lens unit according to the present invention becomes useful.

In the imaging lens unit having the above configuration, at least one of outer circumferential surfaces of the high-water-absorption plastic lens is preferably fitted to an inner wall surface of the lens barrel.

By fitting at least one of the outer circumferential surfaces of the high-water-absorption plastic lens to the inner wall surface of the lens barrel, the optical axis of the plastic lens is matched with the central axis of the lens barrel.

The imaging lens unit according to the present invention is able to suppress a reduction in the optical performance even if the plastic lenses absorb water.

DESCRIPTION OF EMBODIMENTS

Now, an embodiment of the present invention will be described in detail with reference to the accompanying drawings. Note that a configuration described in the following embodiment is only illustrative, can be freely modified or changed, and is not intended to limit the technical scope of the present invention.

Figure 1:
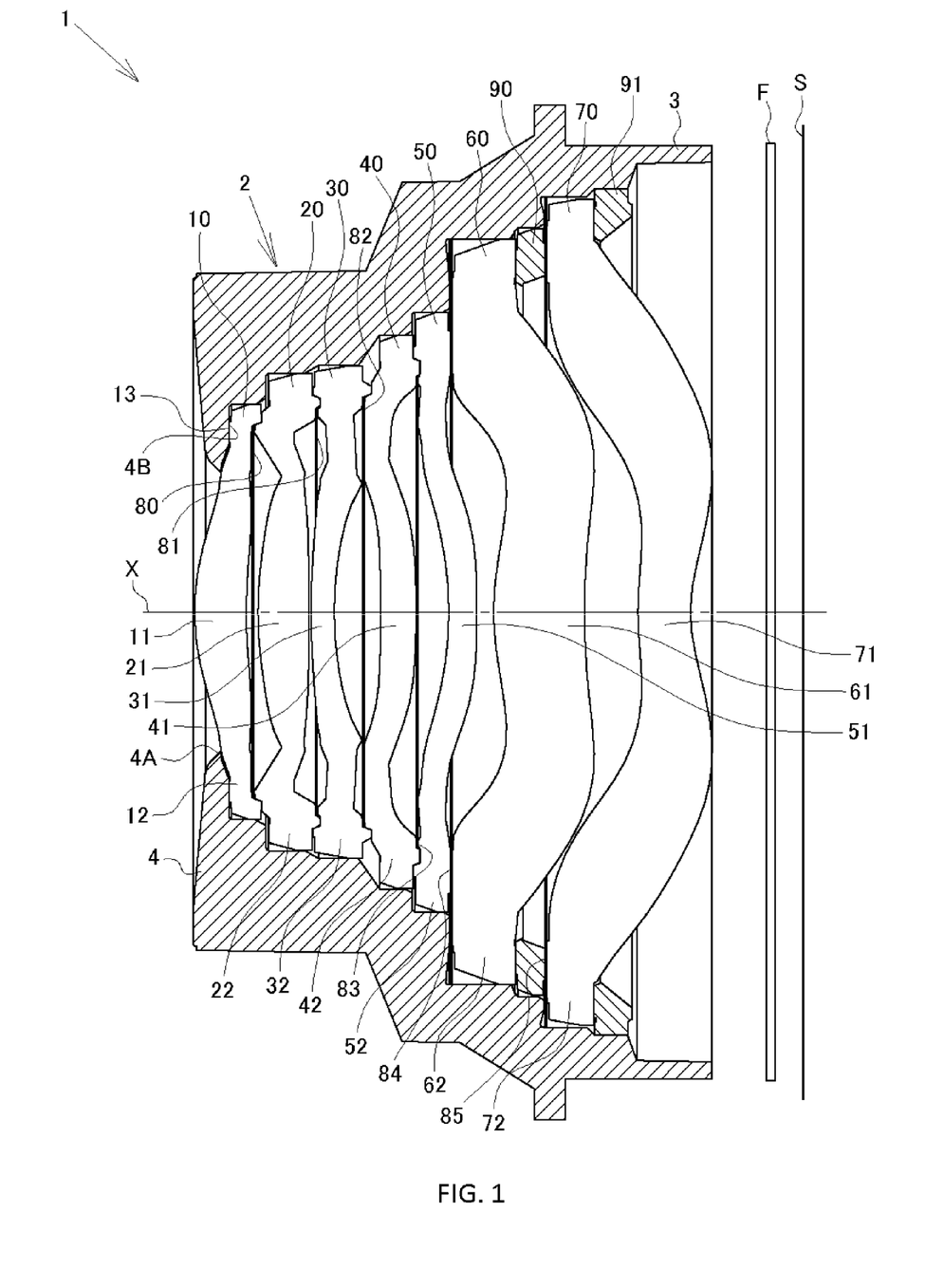
FIG. 1 is a sectional view schematically showing a section of an imaging lens unit according to an embodiment of the present invention.

As shown in FIG. 1, an imaging lens unit 1 according to the present embodiment is mounted on the camera of a portable information device, such as a smartphone, in combination with a solid image sensor S and an infrared cut filter F. The imaging lens unit 1 includes a lens barrel 2 and lenses and the like housed in the lens barrel 2. In the following description, for convenience, the left side in FIGS. 1 to 4 is defined as the front side (or the object-side), and the right side as the rear side (or the image-side).

The lens barrel 2 is formed of, for example, a black, non-transparent resin material, such as polycarbonate, which contains carbon. The lens barrel 2 includes an approximately cylindrical peripheral wall 3 that is open along an optical axis X and a front wall 4 that is formed integrally with the peripheral wall 3 so as to block the front opening. The front wall 4 has, in the center thereof, an opening 4A centered on the optical axis X. The rear surface of the front wall 4 is a receiving surface 4B perpendicular to the optical axis X.

In the imaging lens unit 1 according to the present embodiment, seven plastic lenses are housed in the lens barrel 2. Specifically, a first plastic lens 10, a second plastic lens 20, a third plastic lens 30, a fourth plastic lens 40, a fifth plastic lens 50, a sixth plastic lens 60, and a seventh plastic lens 70 are housed in the lens barrel 2 sequentially from the object-side to the image-side. While, in the present embodiment, the seven plastic lenses are housed in the lens barrel 2, the lens configuration according to the present invention only has to include at least two plastic lenses and may include glass lenses.

Shading plates 80 to 85 formed of a resin are inserted between the first to seventh plastic lenses 10 to 70. The shading plates 80 to 85 are in the shape of a disc that has an opening in the center thereof, and shade unwanted light between the lenses. A spacing ring 90 is inserted between the sixth plastic lens 60 and seventh plastic lens 70. The spacing ring 90 is an annular member and has an opening having a larger diameter than the diameter of the image-side optical effective portion of the sixth plastic lens 60 and the diameter of the object-side optical effective portion of the seventh plastic lens 70. The distance between the surfaces of the sixth plastic lens 60 and seventh plastic lens 70 is determined by the shading plate 85 and spacing ring 90. After housing the first to seventh plastic lenses 10 to 70, shading plates 80 to 85, and spacing ring 90 in the lens barrel 2, an annular presser ring 91 is fixed to the peripheral wall 3 of the lens barrel 2 from behind the seventh plastic lens 70 using an adhesive or the like.

Figure 2:
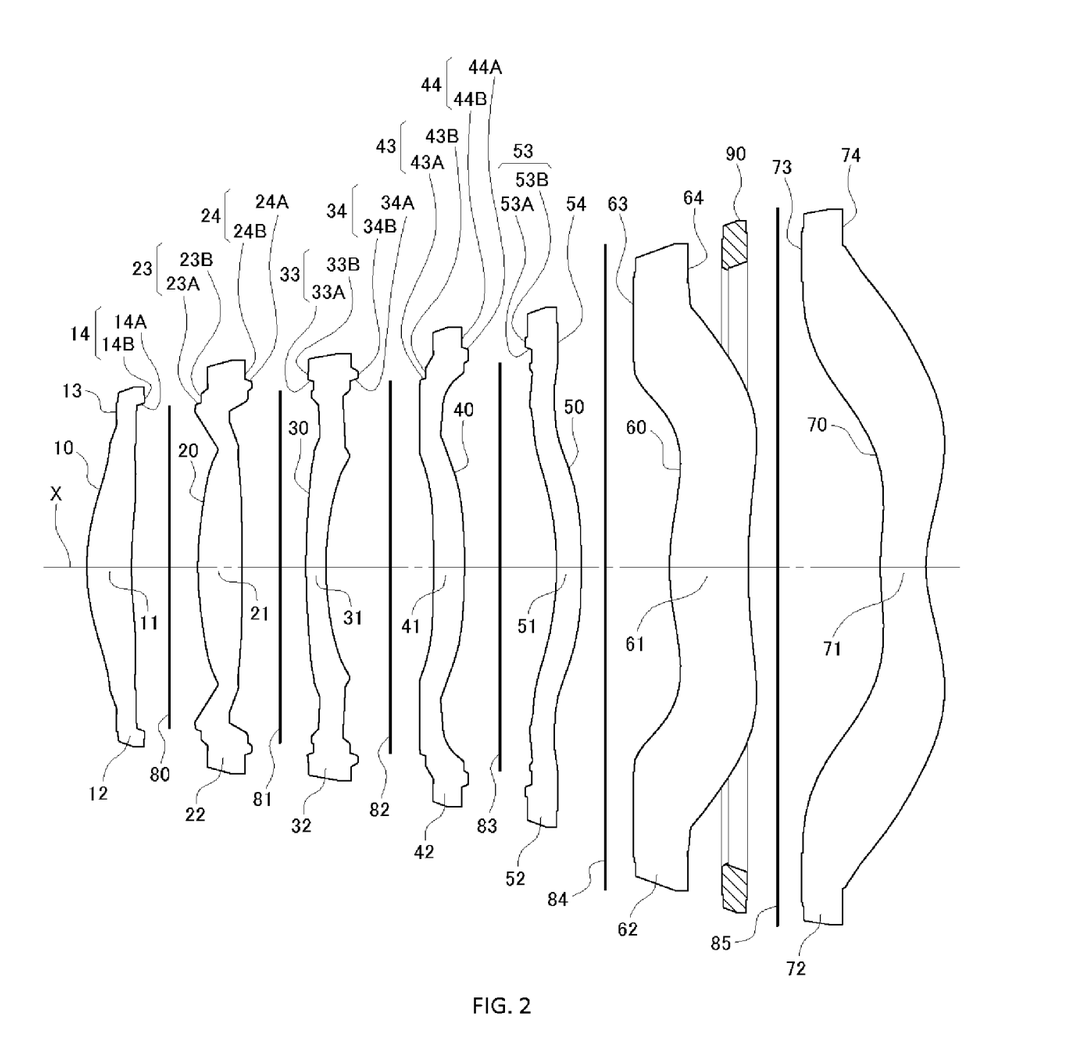
FIG. 2 is an exploded sectional view of the lens assembly of the imaging lens unit shown in FIG. 1.

FIG. 2 is an exploded sectional view of an assembly unit consisting of the first to seventh plastic lenses 10 to 70, shading plates 80 to 85, and spacing ring 90 housed in the lens barrel 2. As shown in FIG. 2, annular steps centered on the optical axis X is formed outside the optical effective portions of the first to fifth plastic lenses 10 to 50, that is, formed on the end portions thereof. By fitting the annular steps of the plastic lenses to each other, the position and posture of the plastic lenses in the lens barrel 2 are held with high accuracy.

The first plastic lens 10 includes a lens portion 11 having a lens function and an end portion 12 located on the periphery of the lens portion 11. The lens portion 11 and end portion 12 are integrally formed. A contact surface 13 perpendicular to the optical axis X is formed on the object-side of the end portion 12. The contact surface 13 is formed in a position that contacts the receiving surface 4B of the lens barrel 2. When the first plastic lens 10 is housed in the lens barrel 2, the contact surface 13 and the receiving surface 4B of the lens barrel 2 contact each other. On the other hand, an annular step 14 is formed on the image-side of the end portion 12. The annular step 14 has a conical fitting slope 14A that is centered on the optical axis X and oriented inward and an annular plane 14B that is connected to the periphery of the fitting slope 14A and oriented toward the image-side. The annular plane 14B is formed perpendicular to the optical axis X.

The second plastic lens 20 includes a lens portion 21 having a lens function and an end portion 22 located on the periphery of the lens portion 21. The lens portion 21 and end portion 22 are integrally formed. An annular step 23 is formed on the object-side of the end portion 22. The annular step 23 has a conical fitting slope 23A that is centered on the optical axis X and oriented outward and an annular plane 23B connected to an end of the fitting slope 23A outward. The fitting slope 23A is formed in a position in which the vertical distance from the optical axis X to the fitting slope 23A and the vertical distance from the optical axis X to the fitting slope 14A approximately match each other. The annular plane 23B is formed perpendicular to the optical axis X. On the other hand, an annular step 24 is formed on the object-side of the end portion 22. The annular step 24 has a conical fitting slope 24A that is centered on the optical axis X and oriented outward and an annular plane 24B connected to an end of the fitting slope 24A outward. The annular plane 24B is formed in parallel with the annular plane 23B.

For assembly, the fitting slope 23A of the second plastic lens 20 is fitted to the fitting slope 14A of the first plastic lens 10, and the annular plane 23B of the second plastic lens 20 is contacted with the annular plane 14B of the first plastic lens 10. Thus, the optical axis of the first plastic lens 10 and the optical axis of the second plastic lens 20 are matched, and the distance between the surfaces of the first plastic lens 10 and second plastic lens 20 is determined.

The third plastic lens 30 includes a lens portion 31 having a lens function and an end portion 32 located on the periphery of the lens portion 31. The lens portion 31 and end portion 32 are integrally formed. An annular step 33 is formed on the object-side of the end portion 32. The annular step 33 has a conical fitting slope 33A that is centered on the optical axis X and oriented inward and an annular plane 33B connected to an end of the fitting slope 33A outward. The fitting slope 33A is formed in a position in which the vertical distance from the optical axis X to the fitting slope 33A and the vertical distance from the optical axis X to the fitting slope 24A of the second plastic lens 20 approximately match each other. The annular plane 33B is formed perpendicular to the optical axis X. On the other hand, an annular step 34 is formed on the object-side of the end portion 32. The annular step 24 has a conical fitting slope 34A that is centered on the optical axis X and oriented inward and an annular plane 34B connected to an end of the fitting slope 34A outward. The annular plane 34B is formed in parallel with the annular plane 33B.

For assembly, the fitting slope 33A of the third plastic lens 30 is fitted to the fitting slope 24A of the second plastic lens 20, and the annular plane 33B of the third plastic lens 30 is contacted with the annular plane 24B of the second plastic lens 20. Thus, the optical axis of the second plastic lens 20 and the optical axis of the third plastic lens 30 are matched, and the distance between the surfaces of the second plastic lens 20 and third plastic lens 30 is determined.

The fourth plastic lens 40 includes a lens portion 41 having a lens function and an end portion 42 located on the periphery of the lens portion 41. The lens portion 41 and end portion 42 are integrally formed. An annular step 43 is formed on the object-side of the end portion 42. The annular step 43 has a conical fitting slope 43A that is centered on the optical axis X and oriented outward and an annular plane 43B connected to an end of the fitting slope 43A outward. The fitting slope 43A is formed in a position in which the vertical distance from the optical axis X to the fitting slope 43A and the vertical distance from the optical axis X to the fitting slope 34A of the third plastic lens 30 approximately match each other. The annular plane 43B is formed perpendicular to the optical axis X. On the other hand, an annular step 44 is formed on the object-side of the end portion 42. The annular step 24 has a conical fitting slope 44A that is centered on the optical axis X and oriented outward and an annular plane 44B connected to an end of the fitting slope 44A outward. The annular plane 44B is formed in parallel with the annular plane 43B.

For assembly, the fitting slope 43A of the fourth plastic lens 40 is fitted to the fitting slope 34A of the third plastic lens 30, and the annular plane 43B of the fourth plastic lens 40 is contacted with the annular plane 34B of the third plastic lens 30. Thus, the optical axis of the third plastic lens 30 and the optical axis of the fourth plastic lens 40 are matched, and the distance between the surfaces of the third plastic lens 30 and fourth plastic lens 40 is determined.

The fifth plastic lens 50 includes a lens portion 51 having a lens function and an end portion 52 located on the periphery of the lens portion 51. The lens portion 51 and end portion 52 are integrally formed. An annular step 53 is formed on the object-side of the end portion 52. The annular step 33 has a conical fitting slope 53A that is centered on the optical axis X and oriented inward and an annular plane 53B connected to an end of the fitting slope 53A outward. The fitting slope 53A is formed in a position in which the vertical distance from the optical axis X to the fitting slope 53A and the vertical distance from the optical axis X to the fitting slope 44A of the fourth plastic lens 40 approximately match each other. The annular plane 53B is formed perpendicular to the optical axis X. An annular plane 54 parallel with the annular plane 53B is formed on the image-side of the end portion 52. The outer circumferential surface of the fifth plastic lens 50 is formed such that it can be fitted to the inner wall surface of the peripheral wall 3 of the lens barrel 2.

For assembly, the fitting slope 53A of the fifth plastic lens 50 is fitted to the fitting slope 44A of the fourth plastic lens 40, and the annular plane 53B of the fifth plastic lens 50 is contacted with the annular plane 44B of the fourth plastic lens 40. Thus, the optical axis of the fourth plastic lens 40 and the optical axis of the fifth plastic lens 50 are matched, and the distance between the surfaces of the fourth plastic lens 40 and fifth plastic lens 50 is determined. Also, the fifth plastic lens 50 is fitted to the lens barrel 2. Thus, the optical axes of the first to fifth plastic lenses 10 to 50 and the central axis of the lens barrel 2 are matched.

The sixth plastic lens 60 includes a lens portion 61 having a lens function and an end portion 62 located on the periphery of the lens portion 61. The lens portion 61 and end portion 62 are integrally formed. An annular plane 63 perpendicular to the optical axis X is formed on the object-side of the end portion 62. An annular plane 64 parallel with the annular plane 63 is formed on the image-side of the end portion 62. The outer circumferential surface of the sixth plastic lens 60 is formed such that it can be fitted to the inner wall surface of the peripheral wall 3 of the lens barrel 2.

The seventh plastic lens 70 includes a lens portion 71 having a lens function and an end portion 72 located on the periphery of the lens portion 71. The lens portion 71 and end portion 72 are integrally formed. An annular plane 73 perpendicular to the optical axis X is formed on the object-side of the end portion 72. An annular plane 74 parallel with the annular plane 73 is formed on the image-side of the end portion 72. The presser ring 91 contacts the annular plane 74. The outer circumferential surface of the seventh plastic lens 70 is formed such that it can be fitted to the inner wall surface of the peripheral wall 3 of the lens barrel 2.

By fitting the outer circumferential surface of the sixth plastic lens 60 and the outer circumferential surface of the seventh plastic lens 70 to the inner wall surface of the peripheral wall 3 of the lens barrel 2, the optical axes of both lenses are matched. Also, by inserting the shading plate 84 between the fifth plastic lens 50 and sixth plastic lens 60, the distance between the surfaces of the fifth plastic lens 50 and sixth plastic lens 60 is determined. Similarly, by inserting the spacing ring 90 and shading plate 85 between the sixth plastic lens 60 and seventh plastic lens 70, the distance between the surfaces of the sixth plastic lens 60 and seventh plastic lens 70 is determined.

As described above, the annular steps formed on the end portions of the plastic lenses are fitted to and contacted with each other, and the outer circumferential surfaces of the lenses are fitted to the inner wall surface of the lens barrel 2. Thus, in the lens barrel 2, the optical axes of the first to seventh plastic lenses 10 to 70 are matched and the distances between the surfaces of the lenses are set to predetermined values.

Next, behavior performed by the lenses of the imaging lens unit 1 according to the present embodiment when absorbing water will be described in comparison with that of an imaging lens unit according to background art.

Figure 3:
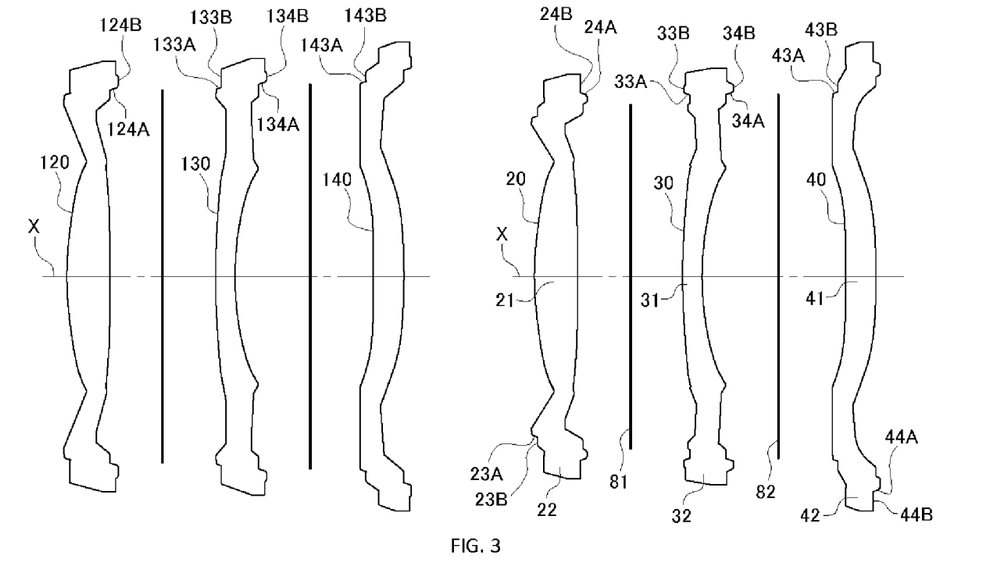
FIG. 3 is an exploded sectional view showing a comparison between second to fourth lenses of the lens assembly shown in FIG. 2 and those according to background art.

FIG. 3 shows a comparison between the structure of the end portions of the second to fourth plastic lenses according to the background art and that according to the present embodiment. The left exploded view of FIG. 3 shows a second plastic lens 120, a third plastic lens 130, and a fourth plastic lens 140 according to the background art. The second plastic lenses 20 and 120 and fourth plastic lens 40 and 140 are low-water-absorption plastic lenses, and the third plastic lenses 30 and 130 are high-water-absorption plastic lenses.

In the lens configuration according to the background art, a fitting slope 124A of the second plastic lens 120 and a fitting slope 133A of the third plastic lens 130 are fitted to each other, and an annular plane 124B of the second plastic lens 120 and an annular plane 133B of the third plastic lens 130 are contacted with each other. The fitting slope 124A is a conical surface that is centered on an optical axis X and oriented inward, and the fitting slope 133A is a conical surface that is centered on the optical axis X and oriented outward. Accordingly, in the relationship between the second plastic lens 120 and third plastic lens 130, the fitting slope 133A of the high-water-absorption plastic lens is located inside the fitting slope 124A of the low-water-absorption plastic lens.

Also, a fitting slope 134A of the third plastic lens 130 and a fitting slope 143A of the fourth plastic lens 140 are fitted to each other, and an annular plane 134B of the third plastic lens 130 and an annular plane 143B of the fourth plastic lens 140 are contacted with each other. The fitting slope 134A is a conical surface that is centered on the optical axis X and oriented inward, and the fitting slope 143A is a conical surface that is centered on the optical axis X and oriented outward. Accordingly, in the relationship between the third plastic lens 130 and fourth plastic lens 140, the fitting slope 134A of the high-water-absorption plastic lens is located outside the fitting slope 143A of the low-water-absorption plastic lens.

When the second to fourth plastic lenses 120 to 140 thus configured absorb water and thus expand, the third plastic lens 130 attempts to expand outward more actively than the other two plastic lenses, which are low-water-absorption ones. At this time, the fitting slope 124A of the second plastic lens 120 regulates the outward expansion of the third plastic lens 130. Thus, stress occurs inside the second plastic lens 120 and third plastic lens 130.

On the other hand, in the relationship between the second plastic lens 20 and third plastic lens 30 according to the present embodiment, the fitting slope 33A of the high-water-absorption plastic lens is located outside the fitting slope 24A of the low-water-absorption plastic lens. Thus, even if the second to fourth plastic lenses 20 to 40 absorb water and thus expand, the outward expansion of the third plastic lens 30 is not regulated by the fitting slope 24A. As a result, the second plastic lens 20 and third plastic lens 30 do not cause the stress due to the interference between the low-water-absorption and the high-water-absorption plastic lenses according to the background art.

Figure 4:
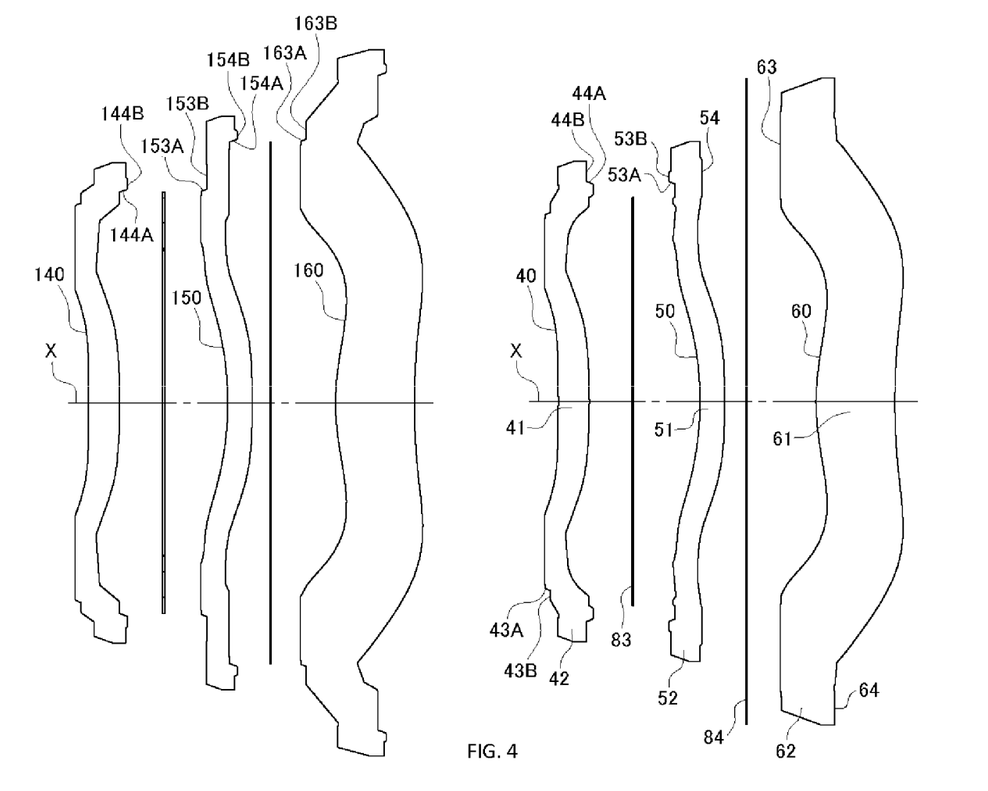
FIG. 4 is an exploded sectional view showing a comparison between fourth to sixth lenses of the lens assembly shown in FIG. 2 and those according to the background art.

FIG. 4 shows a comparison between the structure of the end portions of the fourth to sixth plastic lenses according to the background art and that according to the present embodiment. The left exploded view of FIG. 4 shows the fourth plastic lens 140, a fifth plastic lens 150, and a sixth plastic lens 160 according to the background art. The fourth plastic lenses 40 and 140 are low-water-absorption plastic lenses, and the fifth plastic lenses 50 and 150 and sixth plastic lenses 60 and 160 are high-water-absorption plastic lenses.

In the lens configuration according to the background art, a fitting slope 144A of the fourth plastic lens 140 and a fitting slope 153A of the fifth plastic lens 150 are fitted to each other, and an annular plane 144B of the fourth plastic lens 140 and an annular plane 153B of the fifth plastic lens 150 are contacted with each other. The fitting slope 144A is a conical surface that is centered on the optical axis X and oriented inward, and the fitting slope 153A is a conical surface that is centered on the optical axis X and oriented outward. Accordingly, in the relationship between the fourth plastic lens 140 and fifth plastic lens 150, the fitting slope 153A of the high-water-absorption plastic lens is located inside the fitting slope 144A of the low-water-absorption plastic lens.

Also, a fitting slope 154A of the fifth plastic lens 150 and a fitting slope 163A of the sixth plastic lens 160 are fitted to each other, and an annular plane 154B of the fifth plastic lens 150 and an annular plane 163B of the sixth plastic lens 160 are contacted with each other. The fitting slope 154A is a conical surface that is centered on the optical axis X and oriented inward, and the fitting slope 163A is a conical surface that is centered on the optical axis X and oriented outward. Accordingly, in the relationship between the fifth plastic lens 150 and sixth plastic lens 160, the fitting slope 154A is located outside the fitting slope 163A.

When the fourth to sixth plastic lenses 140 to 160 thus configured absorb water and thus expand, the fifth plastic lens 150 attempts to expand outward more actively than the fourth plastic lens 140. At this time, the fitting slope 144A of the fourth plastic lens 140 regulates the outward expansion of the fifth plastic lens 150. Thus, stress occurs inside the fourth plastic lens 140 and fifth plastic lens 150.

On the other hand, in the relationship between the fourth plastic lens 40 and fifth plastic lens 50 according to the present embodiment, the fitting slope 53A of the high-water-absorption plastic lens is located outside the fitting slope 44A of the low-water-absorption plastic lens. Thus, even if the fourth to sixth plastic lenses 40 to 60 absorb water and thus expand, the outward expansion of the fifth plastic lens 50 is not regulated by the fitting slope 44A. As a result, the fourth plastic lens 40 and fifth plastic lens 50 do not cause the stress due to the interference between the low-water-absorption plastic lens and the high-water-absorption plastic lens according to the background art.

Next, results obtained by simulating stress caused by water absorption and the amount of change in the lens surface distance with respect to the plastic lenses of the imaging lens unit 1 will be described. Here, material physical property values under a high-temperature, high-humidity environment were used as substitutes, and water absorption of the lenses was simulated using a nonlinear static analysis (thermal analysis) in a pseudo manner. Note that the following description is simulation results under given conditions and it is necessary to consider various factors of phenomena that occur on the plastic lenses under the actual environment.

In this simulation, the temperature was raised from 25° C. to 85° C., the heat was held at 85° C., and the temperature was decreased from 85° C. to 25° C. The amount of change in the maximum stress caused in the lenses and the inter-lens surface distance under these environments were evaluated. The temperature rise time, the heat holding time, and the temperature decrease time were the same. During the temperature rise and the heat hold, a value obtained by adding a coefficient of linear expansion converted from the rate of volume expansion due to water absorption to the coefficient of linear expansion of the material, that is, a coefficient of linear expansion considering water absorption (hereafter referred to as the "converted coefficient of linear expansion") was used; during the temperature decrease, the coefficient of linear expansion of the material was used. The volume expansion rate here is a value assuming that the volume has expanded to a volume corresponding to the saturated water absorption rate. Described below are the coefficients of linear expansion, the rate of volume expansion due to water absorption, and the converted coefficients of linear expansion of the first to seventh plastic lenses 10 to 70 and the lens barrel 2 according to the present embodiment. Note that the first to seventh plastic lenses 10 to 70 and the first to seventh plastic lenses according to the background art are represented by L1 to L7.

| | Coefficient of linear expansion [1/K] | Volume expansion rate [%] | Converted coefficient of linear expansion [1/K] |
|---|---|---|---|
| L1 | 6.000E−05 | 0.030 | 6.167E−05 |
| L2 | 6.000E−05 | 0.030 | 6.167E−05 |
| L3 | 6.600E−05 | 0.380 | 8.711E−05 |
| L4 | 6.000E−05 | 0.030 | 6.167E−05 |
| L5 | 6.600E−05 | 0.320 | 8.378E−05 |
| L6 | 7.000E−05 | 0.360 | 9.000E−05 |
| L7 | 6.000E−05 | 0.030 | 6.167E−05 |
| Lens barrel 2 | 7.000E−05 | 0.600 | 10.333E−05 |

In the imaging lens unit 1 according to the present embodiment, the third plastic lens 30 (L3), fifth plastic lens 50 (L5), and sixth plastic lens 60 (L6) correspond to high-water-absorption plastic lenses, which have high water absorption rates, and the first plastic lens 10 (L1), second plastic lens 20 (L2), fourth plastic lens 40 (L4), and seventh plastic lens 70 (L7) correspond to low-water-absorption plastic lenses, which have low water absorption rates. The coefficients of linear expansion of the high-water-absorption plastic lenses are greater than the coefficients of linear expansion of the low-water-absorption plastic lenses.

The first to seventh plastic lenses 10 to 70 satisfy the following condition expressions (1) and (2):

$\beta 1 < 0.1\%$ (1) where $\beta 1$ represents the water absorption rate of the low-water-absorption plastic lens; and $\beta 2 > 0.2\%$ (2) where $\beta 2$ represents the water absorption rate of the high-water-absorption plastic lens.

The water absorption rate of the lens barrel 2 is higher than the water absorption rates of the first to seventh plastic lenses 10 to 70. The lens barrel 2 satisfies the following condition expression (3):

$$\beta 3 > 0.4\% \quad (3)$$

where $\beta 3$ represents the water absorption rate of the resin material of the lens barrel.

Described below are results obtained by simulating the maximum stress caused in the lenses during the temperature rise.

Lens Configuration According to Background Art

| | Maximum stress [MPa] |
|---|---|
| First plastic lens | 0.2802 |
| Second plastic lens 120 | 4.6287 |
| Third plastic lens 130 | 4.1456 |
| Fourth plastic lens 140 | 3.8646 |
| Fifth plastic lens 150 | 3.1516 |
| Sixth plastic lens 160 | 0.9464 |
| Seventh plastic lens | 1.2458 |

Lens Configuration According to Present Embodiment

| | Maximum stress [MPa] |
|---|---|
| First plastic lens 10 | 7.27E−06 |
| Second plastic lens 20 | 6.42E−06 |
| Third plastic lens 30 | 7.38E−06 |
| Fourth plastic lens 40 | 4.94E−06 |

|  | Maximum stress [MPa] |
|---|---|
| Fifth plastic lens 50 | 5.00E−06 |
| Sixth plastic lens 60 | 4.66E−06 |
| Seventh plastic lens 70 | 1.66E−06 |

Figure 5:
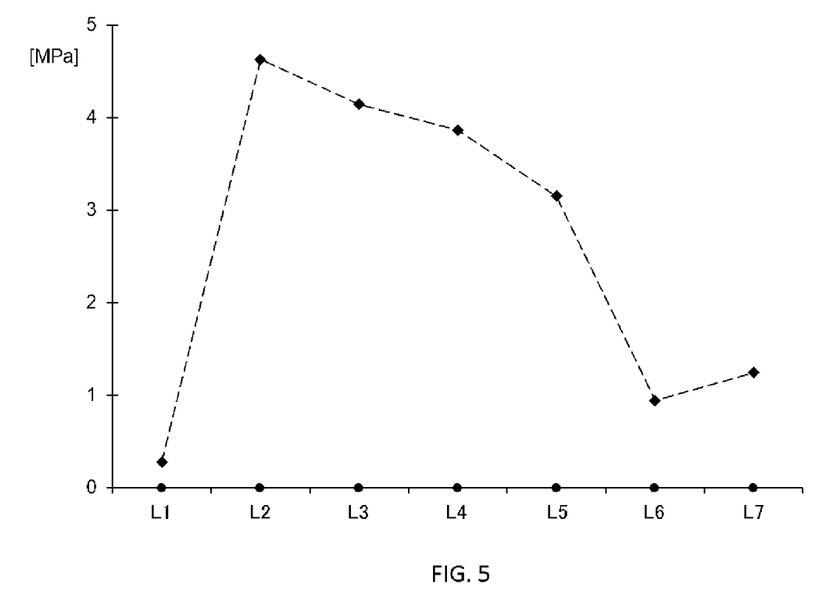
FIG. 5 is a graph showing results obtained by simulating the maximum stress caused in the lenses during a temperature rise with respect to the imaging lens unit shown in FIG. 1.

FIG. 5 is a graph showing the maximum stress caused in the lenses during the temperature rise. In this graph, the maximum stress values in the lenses according to the background art are shown by a broken line, and the maximum stress values in the lenses according to the present embodiment are shown by a solid line. As shown in FIG. 5, almost no stress has occurred in the plastic lenses according to the present embodiment.

Described below are results obtained by simulating the amount of change in the lens surface distance on the optical axis during the temperature decrease. The distance between the surfaces of the first and second plastic lenses is represented by "L1-L2," the distance between the surfaces of the second and third plastic lenses is represented by "L2-L3," and the distances between the surfaces of the other plastic lenses are represented in a similar manner.

Lens Configuration According to Background Art

|  | Amount of change [μm] |
|---|---|
| Between L1-L2 | 2.2681 |
| Between L2-L3 | 2.9313 |
| Between L3-L4 | 1.7682 |
| Between L4-L5 | 1.4240 |
| Between L5-L6 | −4.1091 |
| Between L6-L7 | −0.6189 |

Lens Configuration According to Present Embodiment

|  | Amount of change [μm] |
|---|---|
| Between L1-L2 | 0.0142 |
| Between L2-L3 | −0.1316 |
| Between L3-L4 | 0.6221 |
| Between L4-L5 | 0.4051 |
| Between L5-L6 | 0.4115 |
| Between L6-L7 | −0.4266 |

Figure 6:
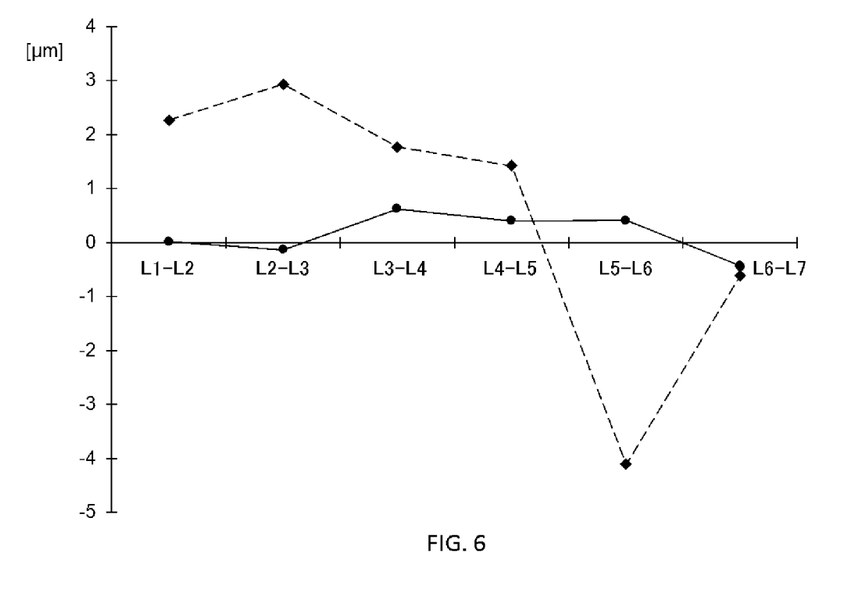
FIG. 6 is a graph showing results obtained by simulating the amount of change in the inter-lens surface distance made during a temperature decrease respect to the imaging lens unit shown in FIG. 1.

FIG. 6 is a graph showing the amount of change in the lens surface distance on the optical axis during the temperature decrease. In this graph, the amount of change in the lens surface distance in the lens configuration according to the background art is shown by a broken line, and the amount of change in the lens surface distance in the lens configuration according to the present embodiment is shown by a solid line. As shown in FIG. 6, the amount of change in the lens surface distance in the lens configuration according to the present embodiment is smaller than that in the lens configuration according to the background art.

The present invention can be mounted on cameras incorporated into portable information devices such as smartphones, household appliances, automobiles, and the like and can be used in fields in which stable optical performance is required.

What is claimed is:

1. An imaging lens unit comprising:
a lens barrel formed of a resin material; and
seven plastic lenses housed in the lens barrel, wherein
the seven plastic lenses have aspheric surfaces on both surfaces,
a first plastic lens to a seventh plastic lens are arranged in order from an object side to an image side,
the first plastic lens to a fifth plastic lens have conical fitting slopes that are centered on an optical axis and are formed outside optical effective portions of the adjacent plastic lenses,
water absorption rates of materials of a third plastic lens and the fifth plastic lens are more than 0.2%, water absorption rates of materials of a second plastic lens and a fourth plastic lens are less than 0.1%, a water absorption rate of a material of the lens barrel is more than 0.4%, and
the fitting slopes of both sides of the third plastic lens are fitted to only outside fitting slopes of the second plastic lens and the fourth plastic lens, respectively, and the fitting slope of the fifth lens is fitted to only outside a fitting slopes of the fourth plastic lens.

2. The imaging lens unit of claim 1, wherein an outer circumferential surface of the fifth plastic lens is fitted to an inner wall surface of the lens barrel.

\* \* \* \* \*